United States Patent [19]
Hayashi

[11] 3,733,561
[45] May 15, 1973

[54] HIGH POWER, FUNDAMENTAL TRANSVERSE MODE OPERATION IN DOUBLE HETEROSTRUCTURE LASERS

[75] Inventor: Izuo Hayashi, Berkeley Heights, N.J.

[73] Assignee: Bell Telephone Laboratories, Incorporated, Murray Hill, Berkeley Heights, N.J.

[22] Filed: July 27, 1971

[21] Appl. No.: 166,370

[52] U.S. Cl. ..........................331/94.5 H, 317/234 R
[51] Int. Cl. ................................................H01s 3/00
[58] Field of Search.................................331/94.5 H; 317/235 N, 235 AC

[56] References Cited

OTHER PUBLICATIONS

Butler et al.: "High Order Transverse Cavity Modes in Heterojunction Diode Lasers", Applied Physics Letters, Vol. 17, pp 403–6, Nov. 1, 1970

*Primary Examiner*—Edward S. Bauer
*Attorney*—R. J. Guenther, et al.

[57] ABSTRACT

For use in a semiconductor injection laser, an active medium comprises a body of semiconductor material having therein: first and second heteroboundaries defining a first active region therebetween of width $d_1$ for confining optical photons, third and fourth heteroboundaries defining a second active region of width $d_2$ for confining injected carriers, the second region being centrally located within the first region, a p-n junction located within the second region, and the magnitude of the index, refraction step $\Delta_{11}$ and $\Delta_{12}$ at the first and second heteroboundaries, respectively, satisfying approximately the relationships $\Delta_{11} d_1^2 = 0.1\ \mu m^2 = \Delta_{12} d_i^2$.

12 Claims, 2 Drawing Figures

HIGH POWER, FUNDAMENTAL TRANSVERSE MODE OPERATION IN DOUBLE HETEROSTRUCTURE LASERS

BACKGROUND OF THE INVENTION

This invention relates to semiconductor lasers and more particularly to transverse mode control in high power double heterostructure injection lasers.

In my copending application Ser. No. 33,750 filed on May 1, 1970, there is described, among other things, a double heterostructure (DH) semiconductor laser diode comprising a narrow bandgap active region sandwiched between a pair of opposite conductivity type wider bandgap regions thereby forming a pair of hetero-boundaries, one at each interface with the narrow bandgap region. A p-n junction is located at or between the heteroboundaries. The difference in bandgap at each interface has two effects: it produces an electric field at each interface which serves to confine injected carriers to the active region, and it produces a discontinuity in index of refraction at each interface which serves to confine photons to the active region. In the active region, therefore, both the carrier concentration (and hence the gain) as well as the coupling between the confined carriers and photons are enchanced resulting in lower thresholds and a lower temperature dependence of the threshold. As reported by M. B. Panish, P. W. Foy, S. Sumski and myself in Applied Physics Letters, 17, 109 (Aug. 1970), this type of DH laser diode has been successfully operated on a c.w. basis at room temperature. The diode was fabricated from GaAs—AlGaAs by a liquid phase epitaxial technique described in copending application Ser. No. 28,365 filed on Apr. 14, 1970, now abandoned.

In some DH lasers it is desired that the thickness of the active region be approximately $\lambda/2$ or less (where $\lambda$ is the wavelength of the stimulated recombination radiation as measured in the semiconductor) in order that higher carrier concentrations be obtained. Several competing mechanisms related to optical loss, carrier-photon coupling and gain dictate, however, that merely decreasing the thickness, without more, may not result in lower thresholds. In order, therefore, to take advantage of high gain resulting from a narrow active region and still obtain low thresholds, it is taught in my copending application Ser. No. 103,252 filed on Dec. 31, 1970 (now U.S. Pat. No. 3,691,476 issued on Sept. 12, 1972) that this object may be achieved in an improved form of DH laser comprising a first narrow bandgap active region and a second narrow bandgap active region intermediate the first region, with the bandgap of the second region being narrower than that of the first region. The first active region is between about $\lambda/2$ and $\lambda$ in thickness and serves to provide optical confinement, whereas the second active region, which may approach an electron diameter in thickness, serves to provide carrier confinement. It should be noted that the designation of the first region as an "active" region deviates somewhat from conventional usage in the prior art which considers the active region as that region in which recombination of holes and electrons takes place. In the improved DH recombination takes place in the second active region which, however, is included within, but is thinner than, the first active region. This structure shall hereinafter be referred to as a double-double heterostructure (DDH).

Considerations relating to increased power handling capability and to the control of transverse modes indicate that for some applications still further improvements in the DDH may be desirable. Thus, although thin active regions are advantageous to reduce thresholds, at the same time thinness often produces such high power densities in these active regions that catastrophic damage to the semiconductor material at the cavity mirrors results. Consequently, there is a trade-off between low threshold and high power operation.

In addition, the thickness $d$ of the active region and the size $\Delta$ of the refractive index step at the heteroboundaries determine which transverse modes perpendicular to the junction plate will oscillate. More particularly, for a given $\Delta$ (about 0.1), a large $d$ (e.g., greater than approximately 1 $\mu$m) permits a plurality of transverse modes to oscillate in the active region. A smaller $d$ (e.g., less than 1 $\mu$m) restricts oscillation to the fundamental transverse mode, a property highly desirable in some applications (e.g., in a communication system to reduce optical coupling problems between optical elements). However, as noted previously, a small $d$ implies a high power density which in some cases may undesirably limit the total power handling capability of the laser.

On the other hand, for a given $d$ a small $\Delta$ may sustain the fundamental transverse mode but suppress higher order modes. This type of mode discrimination results because the electric field of the higher order transverse modes extends further into a relatively higher loss non-active region beyond the heteroboundaries. Since the tails are larger for higher order modes than for the fundamental mode, the former experience more absorption loss to the extent that they may not oscillate at all. The problem, however, is to control the various competing factors to obtain higher power, fundamental transverse mode operation consistent with the need to retain low thresholds for c.w. operation at room temperature.

It is therefore an object of my invention to obtain high power, fundamental mode operation in a semiconductor injection laser.

It is another object of my invention to obtain such operation at thresholds lower than those obtainable in a DH structure having a single active region.

SUMMARY OF THE INVENTION

These and other objects are accomplished in accordance with an illustrative embodiment of my invention, a DDH active medium for use in a semiconductor injection laser comprising a body of semiconductor material having therein: first and second heteroboundaries defining a first active region therebetween of width $d_1$ for confining optical photons, third and fourth heteroboundaries defining a second active region of width $d_2$ for confining injected carriers, the second region being centrally located within the first region, a p-n junction located within the second region, and the magnitude of the index of refraction steps $\Delta_{11}$ and $\Delta_{12}$ at the first and second heteroboundaries, respectively, satisfying approximately the relationships $\Delta_{11}d_1^2$ 32 0.1 $\mu m^2 = \Delta_{12}d_1^2$.

To balance the various trade-offs which arise, several features of my improved DDH cooperate to produce high power, fundamental transverse mode operation at low room temperature thresholds. First, the magnitudes $\Delta_{21}$ and $\Delta_{22}$ of the refractive index steps at the third and fourth heteroboundaries, respectively, are made large enough to confine injected carriers yet small enough to permit the optical field to penetrate beyond the second active region into the first active region which acts as a waveguide. Carriers thus confined tend to produce high gain and low thresholds. Moreover, spreading of the optical field reduces the power density in the active regions. Secondly, the second active region is centrally located within the first active region to reduce carrier-photon coupling for odd-ordered transverse modes whose power distribution is concentrated away from the center of the active regions. Thirdly, the width $d_1$ of the first active region is chosen to be relatively large to reduce the likelihood that the power density in the active regions will cause catastrophic damage. Likely, the refractive index steps $\Delta_{11}$ and $\Delta_{12}$ are chosen to satisfy approximately the relationships $\Delta_{11} d_1^2 = 0.1\ \mu m^2 = \Delta_{12} d_1^2$ which dictates that the tails of the optical field for higher order modes will be larger than for the fundamental mode, hence the former will suffer greater absorption loss. Thus, the combination of the first and third features reduces power densities and thereby increases the power handling capability of my laser; the combination of second and last features tends to suppress higher order modes through decreased coupling and increased absorption loss without the need for using a small $d_1$. Note that a small $d_1$ could restrict oscillation to the fundamental mode but would disadvantageously produce high power densities.

BRIEF DESCRIPTION OF THE DRAWING

These and other objects of my invention, together with its various features and advantages, can be more easily understood from the following more detailed description taken in conjunction with the accompanying drawing in which.

DETAILED DESCRIPTION

Figure 1:
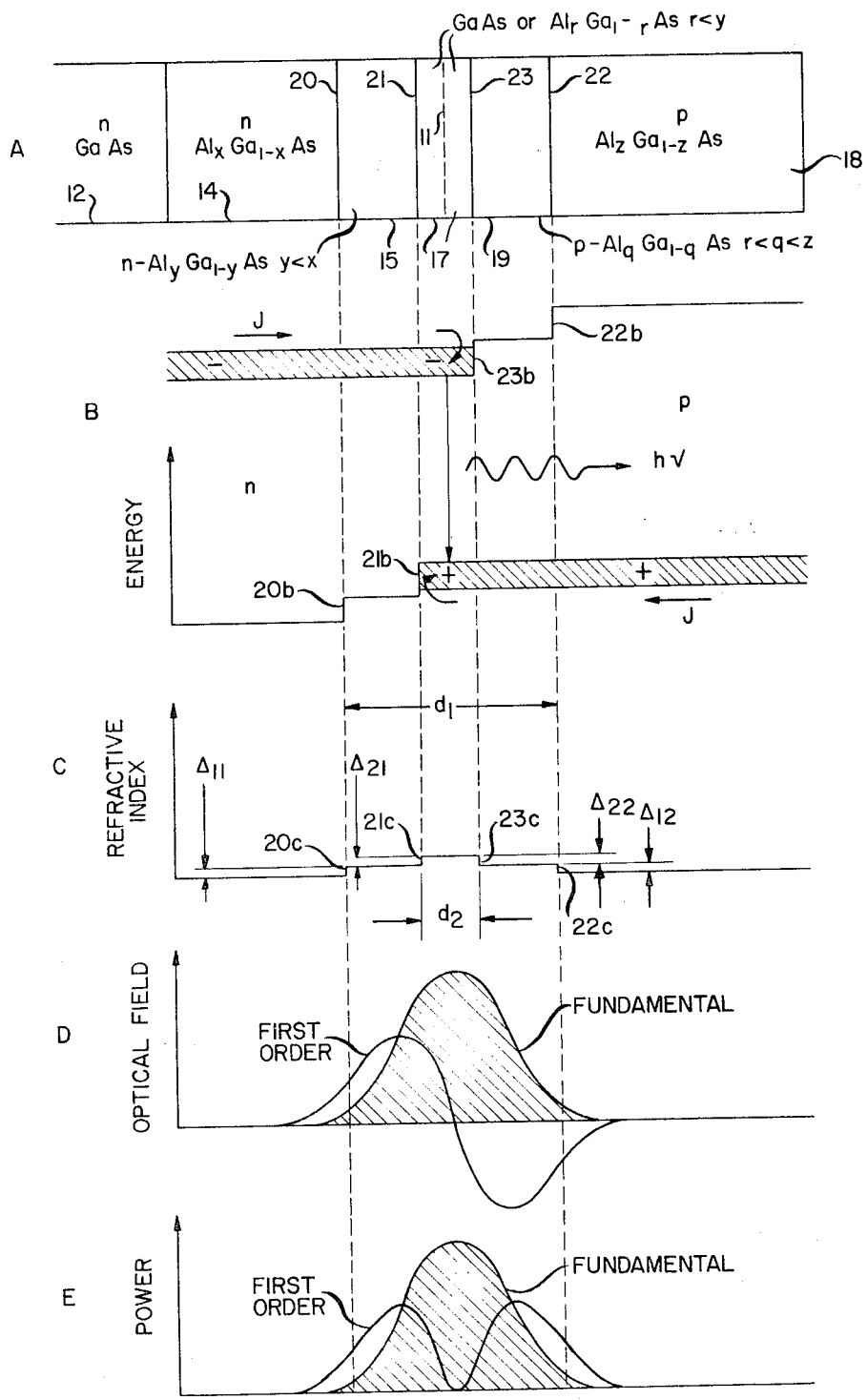
FIG. 1, Part A shows the layered structure of an improved DDH laser in accordance with an illustrative embodiment of my invention and Parts B, C, D and E show the illustrative bandgap profile, refractive index profile, optical field distribution and power distribution, respectively, of such a laser.

Turning now to FIG. 1, Part A, there is shown in accordance with an illustrative embodiment of my invention an improved DDH laser comprising an n-type GaAs substrate 12 upon which are epitaxially grown the following layers in the order recited: an n-type $Al_x Ga_{1-x} As$ layer 14; an n-type $Al_y Ga_{1-y} As$ layer 15 with $y < x$; a GaAs or $Al_r Ga_{1-r} As$ layer 17 with $r < y$; a p-type $Al_q Ga_{1-q} As$ layer 19 with $r < q$; and a p-type $Al_z Ga_{1-z} As$ layer 18 with $q < z$. A first pair of heteroboundaries 20 and 22 are formed at the interfaces between layers 14 and 15 and layers 18 and 19, respectively, and a second pair of heteroboundaries 21 and 23 are formed at the interfaces between layers 15 and 17 and between layers 17 and 19 respectively. A p-n junction 11 is located between heteroboundaries 21 and 23. For simplicity the contacts to my improved DDH laser have not been shown.

Associated with heteroboundaries 21 and 23 are a refractive index steps $\Delta_{21}$ and $\Delta_{22}$, respectively (sometimes referred to hereinafter as simply $\Delta_2$), as shown in FIG. 1, Part C, and corresponding energy steps in the bandgap profile as shown at 21b and 23b in FIG. 1, Part B. The energy step creates an electric field which serves to reflect electrons at heteroboundary 23 and to reflect holes at heteroboundary 21, thereby confining the injected carriers to the second active region 17 of thickness $d_2$. Associated with each heteroboundary 20 and 22, on the other hand, are a refractive index steps $\Delta_{11}$ and $\Delta_{12}$, respectively (sometimes referred to hereinafter as simply $\Delta_1$), as shown at 20c and 22c in FIG. 1, Part C. There form an optical waveguide to confine the optical radiation to the first active region (of thickness $d_1$) between heteroboundaries 20 and 22.

Note that for simplicity the refractive index steps 21c and 23c have been assumed equal to $\Delta_2$ whereas in general they may be unequal. Similarly, refractive index steps 20c and 22c are assumed equal to $\Delta_1$.

A qualitative analysis of my improved DDH laser is as follows. The various parameters of the DDH laser, $d_1$, $d_2$, $\Delta_1$ and $\Delta_2$, are chosen to provide high power, fundamental transverse mode operation at low room temperature thresholds. More specifically, $\Delta_2$ is made large enough to confine injected holes and electrons to the second active region (FIG. 1, Part B) but small enough to permit the optical field to penetrate beyond heteroboundaries 21 and 23 into the first active region (FIG. 1, Part D). This spreading of the optical field decreases the power density in the active regions and reduces the likelihood of catastrophic damage to the semiconductor material. On the other hand, the width $d_2$ of the second active region is made small to produce higher carrier concentrations in the second active region and hence high gains and low thresholds. Illustratively, $\Delta_2$ may be a few percent (of the refractive index of GaAs in a GaAs—GaAlAs DDH) and $d_2$ may be as small as an electron diameter.

Consistent with the magnitude of $\Delta_2$ to spread the optical field, the thickness $d_1$ of the first active region is made large enough to keep the power density within limits which avoid catastrophic damage. Illustratively, $d_1$ is in the range of about 1–10 $\mu m$ which is relatively large compared to most DH lasers which have an active region about 1.0 $\mu m$ or less in thickness. The use of a relatively large $d_1$ without more, however, may permit higher order transverse modes to oscillate. In order to suppress such modes, and restrict oscillation to the fundamental transverse mode, two things are done. First, it is recognized that the power of the fundamental mode is concentrated in the center of the first active region, as shown in FIG. 1, Part E whereas the power of odd-ordered modes is small in the center and large toward the heteroboundaries 20 and 22. In accordance, therefore, with a feature of my invention, the second active region, which confines carriers, is centrally disposed within the first active region which confines photons. Consequently, carrier-photon coupling is greater for the fundamental mode than for odd-ordered modes. The reduced coupling for such higher order modes means that these modes experience less gain and hence tend to be suppressed more easily than the fundamental mode.

Secondly, all higher order modes, both odd and even ordered, tend to be suppressed by making the refractive index step $\Delta_1$ small for a given $d_1$, i.e., such that $\Delta_1 d_1^2 = 0.1\ \mu m^2$ approximately. As mentioned previously, this condition is related to the size of the tails of the mode fields which extend beyond heteroboundaries 20 and 22 into higher optical absorption loss regions 14 and 18 and is further related to the fact that a smaller $\Delta_1$ is required to confine the fundamental mode than the higher order modes. Thus, having chosen $d_1$ to produce tolerable power densities, one determines $\Delta_1$ from the aforementioned equation in order to suppress higher order modes.

Figure 2:
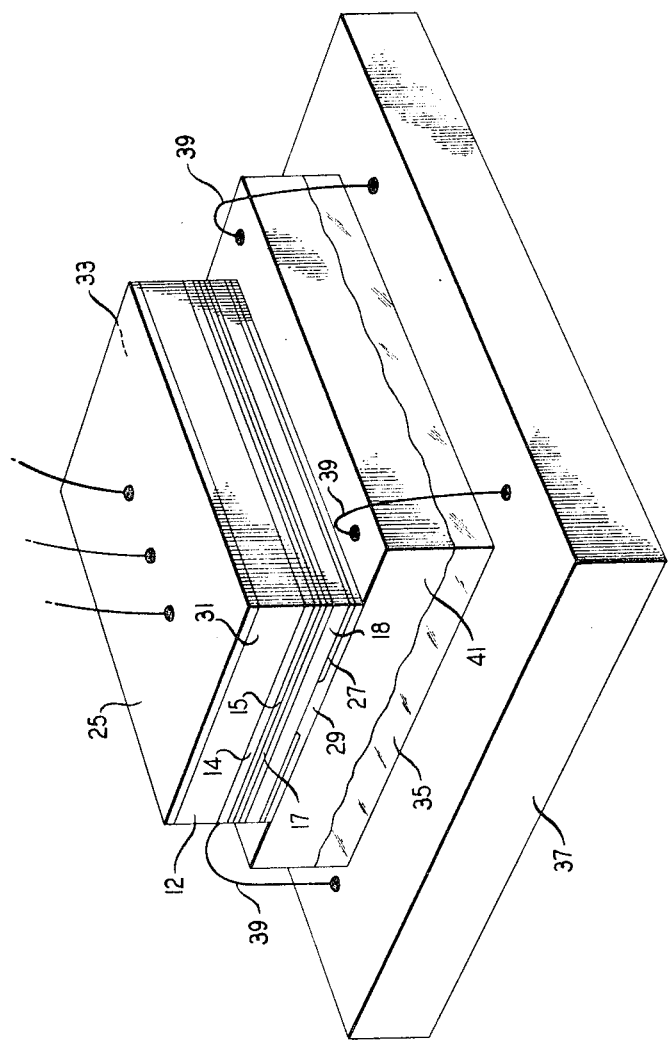
FIG. 2 is a schematic of the improved DDH laser of FIG. 1, Part A mounted on a heat sink.

Turning now to FIG. 2, there is shown an illustrative embodiment of my invention in which the multi-layered improved DDH laser of FIG. 1, Part A is mounted upon a heat sink for pulsed or c.w. operation at room temperature. In the following description materials and dimensions are given for the purposes of illustration only and are not to be construed as limitations on the scope of my invention. As discussed previously, my improved DDH laser comprises an n-type GaAs substrate 12 about 3–4 mils thick upon which are sequentially fabricated epitaxial layers in the following order: an $Al_xGa_{1-x}As$ layer 14 about 3 $\mu m$ thick, a first active region between heteroboundaries 20 and 22 which is about 3 $\mu m$ thick, a second active layer 17 which is typically about 0.2 $\mu m$ thick, and a p-type $Al_xGa_{1-x}As$ layer 18 which is 1 $\mu m$ in thickness. Typically region 15 is n-type whereas region 19 is p-type, but the second active layer 17 may be either p-type, n-type or compensated.

Before depositing a metallic contact 25 onto the n-type substrate 12, another p-GaAs layer (not shown) is grown on p-$Al_xGa_{1-x}As$ layer 18 and then a p-type dopant (e.g., zinc) is typically diffused into the p-type GaAs layer to form a shallow (e.g. 0.2 $\mu m$) $p^+$ layer (not shown) to provide good ohmic contact. On p-type layer 18 is deposited an oxide layer 27 having an elongated channel etched therein by well-known photolithographic techniques to define a stripe electrical contact formed by the deposition of a metal layer 29 thereover.

End faces 31 and 33 of the structure are typically cleaved or polished optically flat and perpendicular to the p-n junction (not shown) to form an optical cavity resonator for sustaining coherent radiation generated in the junction. Illustratively, the diode is about 400 $\mu m$ long and 80 $\mu m$ wide. One of the end faces is made nearly totally reflective (e.g., face 33) whereas the other (face 31) is made partially transmissive in order to provide a means of egress for the coherent radiation.

The laser diode by means well known in the art (but not shown) is forward-biased and pumped by a dc source in excess of the lasing threshold. For pulsed of c.w. operation at room temperature and above, contact 29 may be bonded to a metallized (e.g. tin-plated) high thermal conductivity diamond 35 mounted on a tin-plated copper heat sink 37. Due to the difficulty in getting the tin-plating to cover the entire diamond 35, gold wires 39 (about 25 $\mu m$ in diameter) may be used to ground the tin-plated top surface 41 of the diamond to the heat sink 27. For low thresholds (e.g., 3,000 $A/cm^2$) the diamond may be omitted and the diode mounted directly on the copper heat sink. Furthermore, improved heat extraction may be obtained by mounting the diode between a pair of heat sinks.

In the fabrication of my improved DDH laser either of two techniques may be utilized: a liquid phase epitaxy technique described in the aforementioned application of M. B. Panish and S. Sumski or a molecular beam epitaxy technique as described by J. R. Arthur, Jr. in copending application Ser. No. 787,470 filed on Dec. 27, 1968 (now U. S. Pat. No. 3,615,931 issued on Oct. 26, 1971) and by A. Y. Cho in copending application Ser. No. 127,926 filed on Mar. 25, 1971.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, in a preferred embodiment, the active regions are made symmetrical, i.e., energy steps 20b and 22b are equal (forming a symmetrical waveguide) as are energy steps 21b and 23b, or equivalently $y \approx q < x \approx z$.

In addition, care should be exercised that $\Delta_{21}$ and $\Delta_{22}$ are made large enough so that the frequency of the laser radiation does not fall too near the absorption edge of the adjacent nonactive regions. Otherwise, absorption losses may be undesirably large.

Moreover, my invention is not limited to the use of GaAs—AlGaAs but may employ other semiconductor materials such as $In_xGa_{1-x}As$, $GaAs_{1-x}P_x$ or $GaAs_{1-x}Sb_x$, for example.

What is claimed is:

1. In a semiconductor injection laser, a semiconductor body comprising:
   first and second wide bandgap semiconductor regions of opposite conductivity types,
   a first narrow bandgap active region of thickness $d_1$ intermediate to and contiguous with said first and second wide bandgap regions, there being refractive index steps $\Delta_{11}$ and $\Delta_{12}$, respectively, at first interfaces between said first active region and said first and second wide bandgap regions,
   a second narrow bandgap active region of thickness $d_2$ intermediate said first active region, the bandgap of said second active region being smaller than the bandgap of said first active region, there being refractive index steps $\Delta_{21}$ and $\Delta_{22}$, respectively, at second interfaces between said second active region and said first active region,
   a p-n junction located within said second active region, carriers injected under forward bias across said junction being confined to said second active region where they undergo radiative recombination to generate stimulated coherent radiation, and characterized in that:
   said second active region is centrally disposed within said first active region in order to discriminate against odd-ordered transverse modes, said second interfaces confine injected carriers to said second active region and permit said radiation to penetrate substantially beyond said second active region into adjacent portions of said first active region, $d_1$ is greater than about 1 $\mu m$ in order to reduce the optical power density in said active regions; and $\Delta_{11}$, $\Delta_{12}$ and $d_1$ satisfy approximately the relationships $\Delta_{11}d_1^2 = 0.1 \ \mu m^2 = \Delta_{12}d_1^2$ in order to permit higher order transverse modes of said radiation to penetrate beyond said first interfaces into relatively higher absorption loss regions adjacent thereto.

2. The semiconductor body of claim 1 wherein said first and second wide bandgap regions comprise respectively $Al_xGa_{1-x}As$ and $Al_zGa_{1-z}As$, said first active region comprises $Al_yGa_{1-y}As$, $y < x$ and $y < z$, and said second active region comprises $Al_pGa_{1-p}As$ where $0 \leq p < y$.

3. The semiconductor body of claim 2 wherein $x \approx z$, $(x-y) \approx (z-q)$.

4. The semiconductor body of claim 1 for operation at room temperature and above in combination with a heat sink thermally coupled to said body to extract heat from the region of said p-n junction.

5. In a semiconductor injection laser, a semiconductor body including first and second heteroboundaries defining a first active region of thickness $d_1$ therebetween for confining recombination radiation, there being refractive index steps $\Delta_{11}$ and $\Delta_{12}$, respectively, at said first and second heteroboundaries, third and fourth heteroboundaries disposed between said first and second heteroboundaries, thereby defining a second active region of thickness $d_2$ for confining carriers, the bandgap of said second active region being smaller than that of said first active region and there being refractive index steps $\Delta_{21}$ and $\Delta_{22}$, respectively, at said third and fourth heteroboundaries, a p-n junction located between said third and fourth heteroboundaries, and characterized in that:

said second active region is centrally disposed within said first active region in order to discriminate against odd-ordered transverse modes; said third and fourth heteroboundaries confine injected carriers to said second active region and permit said radiation to penetrate substantially beyond said second active region into adjacent portions of said first active region; $d_1$ is greater than about 1 $\mu$m in order to reduce the optical power density in said active regions; and $\Delta_{11}$, $\Delta_{12}$ and $d_1$ satisfy approximately the relationships $\Delta_{11}d_1^2 = 0.1 \ 12m^2 = \Delta_{12}d_1^2$ in order to permit higher order transverse modes of said radiation to penetrate beyond said first and second heteroboundaries into relatively higher absorption loss regions adjacent thereto.

6. The semiconductor body of claim 5 wherein the said first region comprises $Al_xGa_{1-x}As$, $x < 0$ and said second region comprises $Al_yGa_{1-y}As$, $0 \leq y \leq x$.

7. A semiconductor injection laser comprising a multilayered semiconductor body including the following contiguous epitaxial layers in the order recited:

a first n-type wide bandgap layer, a second layer having a bandgap smaller than said first layer, a third layer having a bandgap smaller than said second layer, a fourth layer having a bandgap larger than said third layer, a fifth p-type layer having a bandgap larger than said fourth layer, said first and second layers and said fourth and fifth layers forming, respectively, first and second heteroboundaries at the interfaces therebetween, said interfaces being separated by a distance $d_1$ and there being refractive index steps $\Delta_{11}$ and $\Delta_{12}$, respectively, at said first and second heteroboundaries, said second and third layers and said third and fourth layers forming, respectively, third and fourth heteroboundaries at the interfaces therebetween, said latter interfaces being separated by a distance $d_2$ and there being refractive index steps $\Delta_{21}$ and $\Delta_{22}$, respectively, at said third and fourth heteroboundaries, a p-n junction located between said third and fourth heteroboundaries, means for forward biasing said junction and for applying thereto current in excess of the lasing threshold to generate stimulated coherent recombination radiation, means forming an optical cavity resonator for sustaining the radiation, means for providing egress of said radiation from said resonator, carriers injected across said junction under the influence of said forward biasing means being confined substantially to a second active region between said third and fourth heteroboundaries, and radiation generated by recombination of said injected carriers being confined substantially to a first active region between said first and second heteroboundaries, and characterized in that:

said third and fourth heteroboundaries define said second active region centrally disposed between said first and second heteroboundaries in order to discriminate against odd-ordered transverse modes; sad third and fourth heteroboundaries confine injected carriers to said second active region and permit said radiation to penetrate substantially beyond said second active region into adjacent portions of said first active region; and $d_1$, $\Delta_{11}$ and $\Delta_{12}$ satisfy approximately the relationships $\Delta_{11}d_1^2 = 0.1$ $\mu m^2$ and $\Delta_{12}d_1^2 = 0.1$ $\mu m^2$ in order to permit higher order transverse modes of said radiation to penetrate beyond said first and second heteroboundaries into relatively higher absorption loss regions adjacent thereto.

8. The laser of claim 7 for operation at room temperature and above in combination with a heat sink thermally coupled to said fifth layer to extract heat generated in said junction.

9. The laser of claim 8 including at least one stripe metallic electrical contact to said fifth layer.

10. The laser of claim 7 wherein the bandgaps of said first and fifth layers are equal and the bandgaps of said second and fourth layers are equal.

11. The laser of claim 7 wherein said first layer comprises $Al_xGa_{1-x}As$, $x < 0$ said second layer comprises $Al_yGa_{1-y}As$, $0 < y < x$ said third layer comprises $Al_pGa_{1-p}As$, $0 \leq p < y$ said fourth layer comprises $Al_qGa_{1-q}As$, $0 < q$, $p < q$, and said layer comprises $Al_zGa_{1-z}As$, $0 < z$, $g < z$.

12. The laser of claim 11 wherein $y \approx 8 < x \approx z$.

* * * * *